Dec. 30, 1924.

W. G. JAEKE

CHAIN FASTENER

Filed May 5, 1924

1,520,952

Inventor
W. G. Jaeke

By Clarence A. O'Brien
Attorney

Patented Dec. 30, 1924.

1,520,952

UNITED STATES PATENT OFFICE.

WALTER G. JAEKE, OF PILGER, NEBRASKA.

CHAIN FASTENER.

Application filed May 5, 1924. Serial No. 711,154.

*To all whom it may concern:*

Be it known that I, WALTER G. JAEKE, a citizen of the United States, residing at Pilger, in the county of Stanton and State of Nebraska, have invented certain new and useful Improvements in Chain Fasteners, of which the following is a specification.

This invention relates to new and useful improvements in chain fasteners, and is principally adapted for use in connection with an anti-skid chain for vehicle tires, and provides a means for securing the free ends of a circumferentially extending chain.

One of the important objects of the present invention is to provide a means for locking the fastener after the same has been secured to the respective ends of the circumferentially extending chain, so as to prevent the accidental opening of the chain fastener, when the same has once been secured in position.

A still further object of the present invention is to provide a chain fastener of the above mentioned character, wherein the locking means associated with the fastener may be readily and easily removed therefrom whenever desired, the locking means being further carried by the chain fastener to prevent the accidental loss of the same when not in use.

A further object of the invention is to provide a chain fastener of the above mentioned character, which is simple in construction, inexpensive, strong and durable, and further well adapted for the purpose for which it is designated.

Other objects and advantages of this invention will become apparent during the course of the following description.

Figure 1:
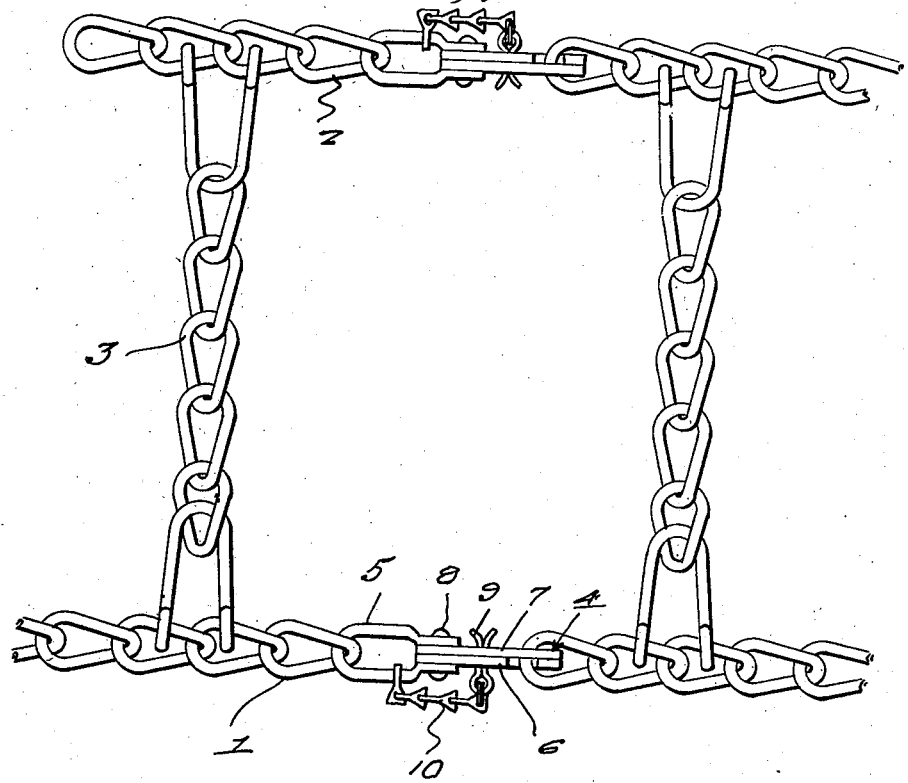
Figure 2:
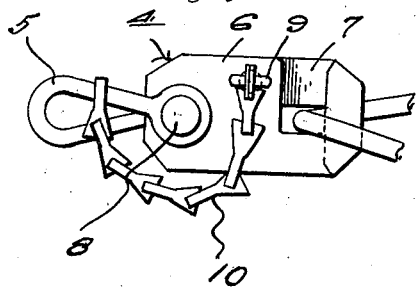

In the accompanying drawing, forming a part of this specification, and in which like numerals designate like parts throughout the same:

Figure 1 is a top plan view of a portion of an anti-skid chain, showing my chain fastener secured to the ends of the circumferentially extending side chains, and Figure 2 is a side elevation of my improved chain fastener.

In the drawing, wherein for the purpose of illustration is shown the preferred embodiment of my invention, the numerals 1 and 2 designate a pair of side chains, which are adapted to extend circumferentially around the tire of a vehicle wheel, in the manner well known in the art, and the side chains are connected together by means of the cross chains, such as are shown at 3. As the constructions of the side chains and cross chains are well known in the art, a further detailed description of the same is not thought necessary, for the purposes of carrying out the objects of the present invention.

Adapted to be secured to one of the free ends of each of the side chains, is my improved chain fastener designated generally by the numeral 4, and to this end I provide the attaching link 5. The link 5 extends through one of the free ends of each side chain, in the manner shown in Figure 1 of the drawing, and adapted to be pivotally supported between the free ends of the link 5 are the complementary hook members 6 and 7 respectively, of my chain fastener. A pivotal means for the complementary hook members is shown at 8 in the drawing. The free ends of the hook members have their hook portions arranged in opposite directions, as clearly shown in the drawing, so as to provide a means for receiving and supporting the opposite free ends of each side chain, in the manner as clearly illustrated.

The complementary hook members comprising my chain fastener are formed of any suitable material, and each of the hook members is provided with an aperture, which apertures are adapted to register with each other when the hook members are in a closed position, in the manner as clearly shown in Figure 2, and the purpose of the provision of the apertures is to provide a means for enabling a locking member to be disposed therein, so as to prevent the accidental opening of the hook members from engagement with the free end of the circumferentially extending side chain which is engaged in the forward ends of the hook members.

The locking means comprises a cotter pin 9, which is fastened to the smaller chain 10, the opposite end of the latter being fastened to the attaching link 5, in the manner as clearly illustrated in the drawing. The provision of a locking means of the above mentioned character, enables the same to be readily and easily placed in locked engagement with the registering apertures provided in the complementary hook members, and furthermore by securing the locking member on the chain, which is fastened to the attaching link 5, the locking member will be prevented from accidentally becoming lost, when not in use.

It can be seen from the foregoing description that a chain fastener has been provided, which may be quickly and easily secured in locked engagement with the free ends of each of the circumferentially extending side chains, and the locking means associated with the chain fastener will prevent the accidental opening of the hook members when the same are once secured to the side chains. A chain fastener of this character will also be strong and durable, and may be manufactured at a very low cost.

While I have shown the preferred embodiment of my invention, it is to be understood that various changes in the size, shape, and arrangement of parts, may be resorted to, without departing from the spirit of the invention and the scope of the appended claim.

Having thus described my invention, what I claim is:

A chain fastener comprising an attaching link, a pair of complementary hook members pivoted thereto, each of the hook members having an opening formed therein, said openings being adapted to register with each other when the hook members are closed, a safety chain fastened at one end to said attaching hook, a locking member carried by the free end of said chain and adapted to be received in the aforesaid registered openings to provide means for locking the hook members against accidental opening, said member being a cotter pin.

In testimony whereof I affix my signature.

WALTER G. JAEKE.